UNITED STATES PATENT OFFICE.

GEORGE F. von KOLNITZ, OF CHARLESTON, SOUTH CAROLINA.

PROCESS OF PRODUCING POTASH.

1,201,396.　　Specification of Letters Patent.　　Patented Oct. 17, 1916.

No Drawing.　　Application filed January 7, 1916.　Serial No. 70,780.

*To all whom it may concern:*

Be it known that I, GEORGE F. VON KOLNITZ, a citizen of the United States, residing at Charleston, in the county of Charleston and State of South Carolina, have invented certain new and useful Improvements in Processes of Producing Potash, of which the following is a specification.

This invention relates to the production or manufacture of potash or potassium salts, especially the chlorid, from the mineral glauconite, also known as greensand, and has for its object to provide an improved and practical process for making said compound directly from the mineral indicated, or from similar silicates.

The production of potassium salts or compounds from glauconite has been heretofore proposed, as for example by the process disclosed in the patent to Eckel, No. 1011172. The present invention is designed as or amounts to an improvement on said patented process, involving simpler and cheaper operation, and more direct and better results, having various points of difference as will more fully appear from the following description. The availability of greensand as a source of potash, with respect to its cheapness and its natural condition, is discussed in said patent, and need not be repeated here, except to reaffirm its superiority for the desired purpose to the feldspars and other minerals from which it has heretofore been proposed to extract potash.

In performing my process in the best manner known to me, I first heat the greensand, either with or without preliminary treatment, such as powdering or washing, at a temperature of not more than 435 degrees, preferably about 335 degrees centigrade which expels the combined moisture and also acts to change the ferrous oxid and silicate to ferric oxid, the temperature employed being insufficient to cause any marked volatilization of the potash, but sufficient to prepare the material for the chemical treatment which follows. This preheated material is then mixed with calcium chlorid ($CaCl_2$) to a temperature sufficient to promote the chemical reaction, but preferably not to exceed 950 degrees centigrade. The amount of calcium chlorid which I have found to give the best result is about 20% by weight of that of the greensand, although favorable results have been produced with the percentage of calcium chlorid as low as $12\frac{1}{2}\%$, and less favorable results with even as low as 5%.

The second heating referred to should be done in a closed vessel, and in a reducing atmosphere, or without air, so as to prevent the decomposition of the calcium chlorid, preferably in a rotary furnace, or one in which the mass is stirred, to agitate the material and thus assist the intimate mixture and chemical reaction of the materials. The preheating is preferably done under open conditions, or in the presence of air. The calcium chlorid acts not only as a flux, but its chlorin permeates the mass and reacts on the potash to form a water soluble potassium chlorid, the calcium constituent uniting with the other elements of the greensand. Finally, the water soluble potash, muriate in character, or potassium chlorid, is leached out of the mass and boiled down to about 27 or 28 degrees Baumé and crystallized out, and dried to form a commercial product.

It has been found that by this process practically pure potassium chlorid may be extracted at a relatively small cost, and by using proper quantities and treatment almost all of the potassium in the material is recovered, the result being decidedly superior, both with respect to cost of treatment and the relative value of the product, to any other process known to me.

The invention is not limited to the exact materials specified, nor to the exact temperatures and mode of treatment specified, but equivalents may be used, or modifications employed, within the scope of the invention as defined in the following claims.

What I claim is:

1. The process of producing potassium chlorid from greensand, comprising preheating the greensand in the presence of an oxidizing medium sufficiently to change its ferrous oxid to ferric oxid and then heating the material in the presence of calcium chlorid to form potassium chlorid, and recovering the potassium chlorid so formed.

2. The process of producing potassium chlorid from greensand, comprising preheating the greensand in the presence of an oxidizing medium to a temperature sufficient to change its ferrous oxid to ferric oxid, and then heating the material in the presence of calcium chlorid to a higher temperature to form potassium chlorid, the temperature in each instance being insufficient to volatilize the potash, and recovering the potassium chlorid so formed.

3. The process of obtaining potassium chlorid from greensand, comprising preheating the greensand in the presence of air, and then heating the material in the presence of calcium chlorid in a reducing atmosphere, to form potassium chlorid, and recovering the potassium chlorid so formed.

4. The process of producing potassium chlorid from greensand comprising preheating the greensand in the presence of an oxidizing medium to about 385 degrees C., and then heating the material to a higher temperature in the presence of calcium chlorid and in a reducing atmosphere, to form potassium chlorid, and recovering the potassium chlorid so formed.

In testimony whereof, I affix my signature in presence of two witnesses.

GEO. F. von KOLNITZ.

Witnesses:
N. M. O'ROURKE,
GEORGE F. von KOLNITZ, Jr.